United States Patent [19]

Zimmer et al.

[11] 4,203,554

[45] May 20, 1980

[54] VALVE-NEEDLE MOUNTING FOR DYESTUFF APPLICATOR

[75] Inventors: Peter Zimmer; Hans Kudlich, both of Kufstein; Karl Schweitzer, Oberlangkampfen; Walter Mayr, Wiesing, all of Austria

[73] Assignee: Maschinenfabrik Peter Zimmer Aktiengesellschaft, Kufstein, Austria

[21] Appl. No.: 887,833

[22] Filed: Mar. 17, 1978

[30] Foreign Application Priority Data

Mar. 24, 1977 [AT] Austria ................................ 2078/77

[51] Int. Cl.[2] .......................... B05B 1/08; B05C 5/00; F16K 31/02

[52] U.S. Cl. ................................ 239/585; 68/205 R; 251/141; 251/337; 267/160

[58] Field of Search ................ 239/583, 585; 267/160; 251/129, 141, 337; 118/300; 68/205 R

[56] References Cited

U.S. PATENT DOCUMENTS 3,366,288 1/1958 Goldschein ...................... 251/141 X
3,536,315 10/1970 Jenkin .............................. 267/160 X
4,141,231 2/1979 Kudlich ............................ 68/205 R

FOREIGN PATENT DOCUMENTS 901830 6/1972 Canada .................................... 267/160

*Primary Examiner*—John J. Love
*Assistant Examiner*—Andres Kashnikow
*Attorney, Agent, or Firm*—Montague & Ross

[57] ABSTRACT

A nozzle of a dyestuff applicator has a cylindrical valve housing formed with an orifice obstructable by the tip of an electromagnetically displaceable needle which controls the outflow of dyestuff from a chamber in that housing. The chamber is sealed by a rubber diaphragm which is penetrated by the needle whose shaft is engaged by a pair of parallel membranes of spring steel peripherally clamped in an extension of the housing. Each membrane comprises a narrow outer ring with an inwardly projecting tongue split into two diverging branches which are interconnected at their free ends, near the diametrically opposite side of the outer ring, by a re-entrant web extending radially between these branches and terminating in an inner, needle-supporting ring concentric with the outer ring.

8 Claims, 2 Drawing Figures

VALVE-NEEDLE MOUNTING FOR DYESTUFF APPLICATOR

FIELD OF THE INVENTION

Our present invention relates to a dyestuff applicator serving for the patterning of a substrate by the direct-spray technique, i.e. without the use of a printing screen.

BACKGROUND OF THE INVENTION

In commonly owned U.S. patent application Ser. No. 709,550 filed July 28, 1976 by one of us, Hans Kudlich, now U.S. Pat. No. 4,141,23 , there has been disclosed such an applicator comprising an array of spray nozzles with discharge orifices closely spaced from a textile web to be patterned. Each nozzle has a housing with a discharge orifice which can be selectively blocked and unblocked by an electromagnetically actuated valve needle in line with the orifice axis. The selective energization of the electromagnetic needle actuators is carried out, under the control of a programmer, between intermittent advances of the textile web in a direction transverse to the nozzle array.

As further disclosed in that prior patent, each valve needle can be supported by a pair of parallel membranes which are interconnected at their centers by a spacing sleeve surrounding the needle, the rims of the membranes being firmly clamped in position at the inner housing wall. This mode of mounting insures a precise axial orientation of the needle while leaving it free to oscillate in response to the applied electromagnetic field, e.g. at frequencies on the order of 2000 to 3000 Hz.

OBJECTS OF THE INVENTION

An important object of our present invention is to provide an improved membrane for the mounting of such a valve needle, designed to facilitate its displacement at the frequencies referred to with low consumption of electrical or possibly other forms of energy.

Another object is to provide means in such a mounting for reducing the wear of the needle tip coacting with the discharge orifice.

SUMMARY OF THE INVENTION

In accordance with our present invention, the needle mounting includes a membrane (or, preferably, two substantially identical membranes interconnected in the aforedescribed manner) of resilient foil material, such as spring steel, comprising an outer ring centered on the orifice axis and a tongue integral with that ring projecting radially inward from a sector thereof toward a diametrically opposite sector, the tongue being split into two diverging branches which are interconnected near that opposite sector by an integral web with a reentrant formation extending radially in a gap between the branches and terminating in an inner ring also centered on the orifice axis. The latter ring, which may be connected by a spacing sleeve with a corresponding ring of a substantially identical second membrane, is in firm engagement with the valve needle.

BRIEF DESCRIPTION OF THE DRAWINGS

The above and other features of our invention will now be described in detail with reference to the accompanying drawing in which.

SPECIFIC DESCRIPTION

Figure 1:
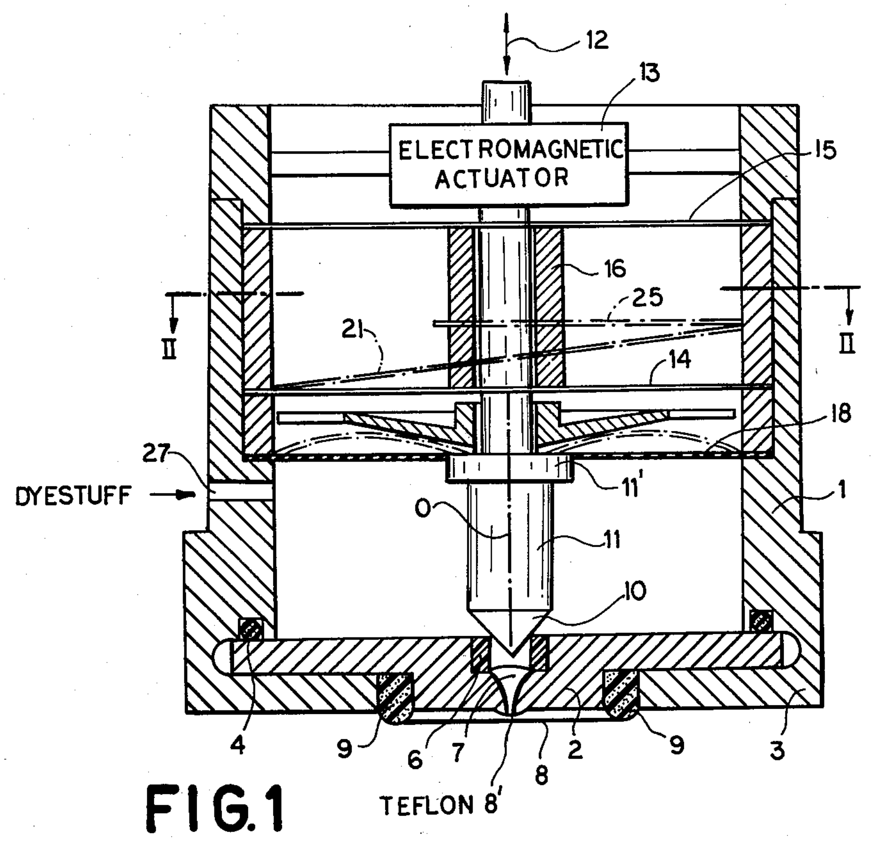
FIG. 1 is an axial sectional view of a spray nozzle embodying our invention.

The nozzle shown in FIG. 1 comprises a cylindrical housing 1 which is centered on an axis 0 and is closed at its bottom by a wall member 2 held in position by a clamping nut 3 which presses that member against a sealing ring 4. The lower part of housing 1 defines a pressure chamber 5 with an entrance port 27 for the admission of liquid dyestuff. Chamber 5 is closed at its top by a diaphragm 18 of rubber or synthetic resin overlain by a stationary collar 17 against which that membrane comes to lie, under pressure of the dyestuff, as indicated in phantom lines.

Bottom wall 2 has an orifice 7, centered on axis 0, which converges generally frustoconically (or possibly frustopyramidally) toward a narrow exit end on a land 8 at the lower wall surface. This land 8 is formed with an annular ridge 8′ bounding that exit end to keep the issuing dyestuff away from the surrounding area. Any dyestuff leakage adhering to that surrounding area may be picked up by an annular pad 9 of absorbent material. The wider entrance end of orifice 7 is lined by a bushing 6 of thermoplastic material, preferably polytetrafluoroethylene (Teflon).

Bushing 6 is resiliently deformable by the tip 10 of a valve needle 11 which freely traverses the collar 17 and is centered on axis 0, a shoulder 11′ of that needle being fixedly secured to diaphragm 18. The extremity of the needle stem opposite tip 10 traverses an electromagnetic actuator 13 which may be of the type described in the above-identified U.S. Pat. No. 4,141,231 and serves to oscillate the needle as indicated by a double-headed arrow 12.

In accordance with an important feature of our invention, the part of the needle stem projecting above dyestuff chamber 5 is supported by a pair of parallel membranes 14, 15 of spring steel interconnected by a spacing sleeve 16. Each of these membranes has a configuration as particularly illustrated for membrane 14 in FIG. 2. Thus, the unitary membrane body is stamped from a thin foil forming an outer ring 19 which is clamped to the housing wall and has an inner periphery 20 merging into two slender branches 21′, 21″ of a radially inwardly projecting tongue 21 separated by a narrow arcuate clearance 28 from the diametrically opposite ring sector. Branches 21′ and 21″ diverge at an acute angle toward clearance 28 so as to form a generally triangular gap 22 between them. Each branch decreases in width up to its point of intersection with a transverse plane 23 passing through axis 0; beyond that point it broadens again and merges integrally with a web 25 interconnecting the free ends of these branches, the web having a re-entrant formation in the shape of a radially extending strip 25′ which terminates in an inner ring 26 concentric with outer ring 19. It will be noted that the outer edges 24′ and 24″ of branches 21′ and 21″ are substantially straight but that their inner edges are bent at plane 23 so that the width of gap 22 remains substantially constant between that plane and the free end of tongue 21 adjacent clearance 28.

Figure 2:
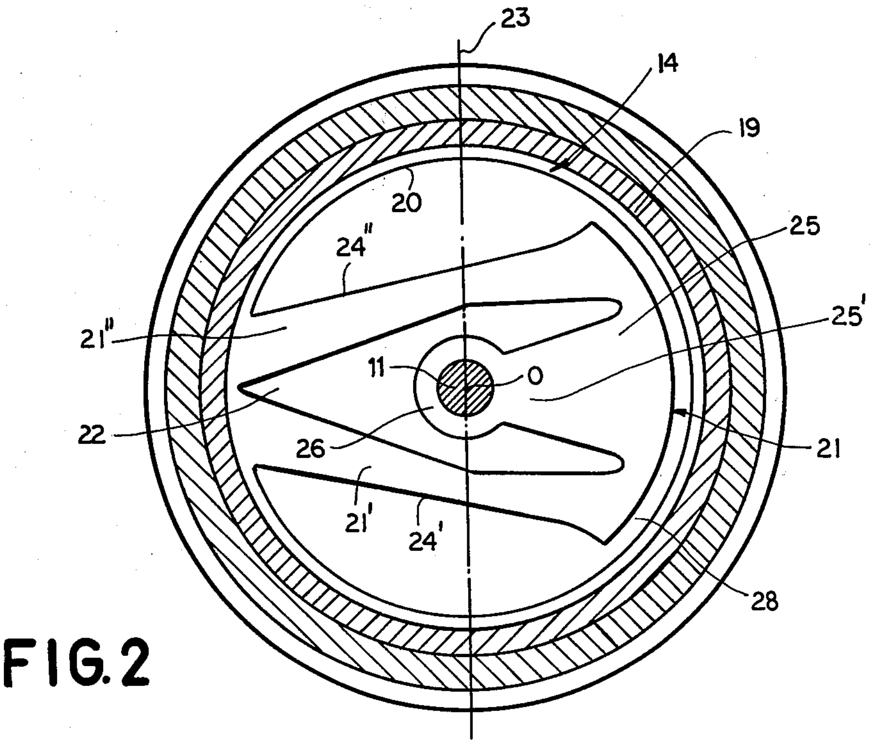
FIG. 2 is a cross-sectional view of the spray nozzle taken on the line II—II of FIG. 1.

As also shown in FIG. 2, the inner ring 26 firmly engages the stem of needle 11. Sleeve 16 (not shown in FIG. 2) is secured to the respective inner rings of membranes 14 and 15 which are of substantially the same outer diameter as the sleeve. Their inner diameters may also be alike, with elimination of the cylindrical space shown to separate the sleeve 16 from the needle.

With the configuration described and illustrated, the needle-supporting rings 26 have a high degree of flexibility making the needle support very sensitive to an electromagnetic field applied by actuator 13. Thus, an upward attraction of the needle 11 from its illustrated position deflects the membrane portions 19, 21 and 25 into a generally Z-shaped structure (as exaggeratedly indicated in phantom lines in FIG. 1), with web 25 and ring 26 remaining parallel to ring 19. In the absence of an applied electromagnetic field, the membranes 14, 15 are inherently biased to hold the tip 10 against bushing 6 to establish the normal blocking position illustrated in FIG. 1. The presence of this bushing results in a reduced wear of the needle tip despite high oscillating frequencies.

The collar 17, here shown as having a frustoconical shape, could also be generally mushroom-shaped so as to have a convex undersurface backstopping the diaphragm 18.

We claim:

1. In a dyestuff applicator comprising a nozzle for spraying dyestuff onto a substrate to be patterned, the improvement wherein said nozzle comprises:

- a housing forming a dyestuff chamber with an end wall provided with a discharge orifice centered on an axis;
- a valve needle in said housing having a tip receivable in said orifice;
- actuating means operatively coupled with said valve needle for selectively blocking and unblocking said orifice by displacing said valve needle along said axis; and
- mounting means for movably supporting said valve needle on a generally cylindrical part of said housing centered on said axis, said mounting means including at least one membrane of resilient foil material comprising an outer ring centered on said axis and a tongue integral with said outer ring projecting radially inwardly from a sector thereof toward a diametrically opposite sector, said tongue being split into two slender branches which diverge at an acute angle and are interconnected near said opposite sector by an integral web with a reentrant strip extending radially in a generally triangular gap between said branches and terminating in an inner ring centered on said axis, said valve needle being engaged by said inner ring.

2. The improvement defined in claim 1 wherein said branches decrease in width up to a region of intersection with a transverse plane passing through said axis and thereafter broaden up to their junction with said web.

3. The improvement defined in claim 2 wherein said gap is of substantially constant width between said transverse plane and the free end of said tongue.

4. The improvement defined in claim 1, 2 or 3 wherein said mounting means includes a second membrane substantially identical with the first-mentioned membrane, said membranes being interconnected by a sleeve secured to their inner rings and traversed by said valve needle.

5. The improvement defined in claim 1 wherein said orifice has an entrance end lined with a thermoplastic bushing engageable by said tip.

6. The improvement defined in claim 5 wherein said bushing consists of polytetrafluoroethylene.

7. The improvement defined in claim 1 wherein said orifice opens onto an outer surface of said end wall provided with an annular ridge surrounding an exit end of said orifice.

8. The improvement defined in claim 7 wherein said outer surface is provided with an absorptive annular pad spacedly surrounding said ridge for picking up leaking dyestuff.

* * * * *